3,371,079
CATALYST AND CATALYTIC PROCESS
Edwin F. Peters, Lansing, and Omar O. Juveland, South Holland, Ill., assignors to Standard Oil Company, Chicago, Ill., a corporation of Indiana
No Drawing. Continuation-in-part of application Ser. No. 197,911, May 28, 1962. This application May 21, 1965, Ser. No. 457,844
1 Claim. (Cl. 260—94.9)

This application is a continuation-in-part of Ser. No. 197,911 filed May 28, 1962 now abandoned.

This invention relates to improved catalysts for polymerization of ethylenically unsaturated compounds, the preparation of such improved polymerization catalysts, and their use in polymerization processes.

Our improved polymerization catalysts comprise a transition metal oxide extended upon a difficulty reducible support, with at least one of these components possessing an exceptionally small particle size and low apparent density. Such properties lead to catalysts of surprisingly enhanced catalytic activity as compared to those known heretofore in the related art. We prefer to employ a transition metal oxide of exceptionally small particle size upon a difficultly reducible support of similarly small size.

By transition metal oxide we mean the oxides of transition metals in group 5 of the Mendeleef Periodic table. These can be obtained by oxidation of the salts and metallo-organic derivatives, or mixtures of the compounds of such metals.

By difficultly reducible supports, we mean supports which are relatively unreactive with a reducing component or components of the reaction system, and which preferably have a particle diameter of less than 1 micron and a low apparent density.

Suitable ethylenically unsaturated compounds for polymerization with the catalysts of our invention are such as the terminal 1-olefins of the general formula $$RCH=CH_2$$

wherein R is hydrogen or a hydrocarbon radical.

Transition metal compounds especially useful for the practice of our invention are, for example, oxides; halides; oxy-halides; phosphates; sulfates; oxalates; carbonyls; organo-chelates; organo-metallics of the general formula $M(OR)_n$, wherein M represents the transition metal, R is an alkyl or aryl radical and $n$ is the valence of M, and organo-metallics of the general formula $MX_mR_n$, wherein M represents the transition metal, X is a halide, R is an alkyl or aryl radical and the sum of $m$ plus $n$ is the valence of M. The activation of the catalyst according to our preparative method, by calcination in the presence of oxygen, alone or in admixture with inert gases, prior to its use in polymerization, converts the transition metal compound component of the catalyst to an oxide. Hence, a finely divided transition metal could be placed on the support and oxidized to the transition metal oxide through the calcination procedure. Certain transition metal compounds, such as sulfates and phosphates, require especially rigorous conditions of calcination for conversion to oxides. Specific examples of useful transition metal compounds are such as vanadium pentoxide, vanadium oxytrichloride, vanadium tribromide, vanadium dichloride, vanadium tetrachloride, vanadium oxydibromide, tetrabutyl vanadate, sodium vanadate, etc.

Preferably, the solid transition metal compound should be subdivided into particles with very small diameters prior to extending such compound on the support material. The subdivision can be accomplished ultrasonically, chemically, mechanically, or by other suitable means which will produce material with a low apparent density. Ball-milling is not suitable since it causes an attrition of the transition metal compound particles which destroys low apparent density. A liquid transition metal compound may be distilled or sublimed onto the support. As one example of a useful preparative method, a suitable vanadium pentoxide can be made by hydrolyzing vanadium oxytrichloride with high temperature steam.

The supports in our improved catalysts are such compounds as the difficultly reducible metal oxides, for example, alumina, magnesia, titania, boria, zirconia, silica, or their composites, such as synthetic alumino silicates, etc. and their physical mixtures. By the description "difficulty reducible," we mean that the supports are such materials as are not reduced under the usual conditions of polymerization, in the presence of the usual catalyst promoters, such as described herein. The support may contain an acidic oxide such as phosphorus pentoxide. In order that these supports furnish the especially active polymerization catalysts of this invention, we prefer that they have an exceptionally small particle diameter, that is, less than 1 micron and, preferably, less than 0.2 micron, with a low apparent density, for example, less than one-tenth gram per cubic centimeter. Supports of suitably small size possess relatively high external surface area within the range of about 1 to 1500 square meters per gram. Useful supports may be selected from materials with a surface area in the range of 50 to 1000 square meters per gram. Our preferred supports have a particle diameter of 0.01 to 0.04 micron, an apparent density of about 0.04 gram per cubic centimeter and an external surface area of from about 100 to 500 square meters per gram. These supports can be prepared by methods such as described hereinabove for the transition metal compounds, or suitable commercially available materials can be used (a suitable commercial silica is that supplied by Godfrey L. Cabot, designated Cab-O-Sil, Grade M–5; a suitable commercial alumina from the same source as Alon C). 

Various methods may be used to place the transition metal compound on the support, but the chosen method should be such as not to destroy the low apparent density of the catalyst component or components having exceptionally small particle size. As mentioned hereinbefore, liquid transition metal compounds may be distilled or sublimed onto the support. We mix a selected solid transition metal compound with a support of exceptionally small particle diameter, so that the very low apparent density of the support is not destroyed through mechanical attrition of the support structure, by employing a screening and/or tumbling process which can be effectively carried out through use of a 100-mesh screen and/or tumbling in a gently rotating flask fitted with a lightweight internal chain. The usual wet impregnation procedures have been found not to lead to our improved catalyst.

Our novel catalysts can be applied to the treatment of any organic compound containing an ethylenic linkage which is susceptible of addition polymerization. These are such compounds as the terminal 1-olefins of the formula $RCH=CH_2$ wherein R is hydrogen or a saturated monovalent hydrocarbon radical, for example, alkyl, cycloalkyl, aryl, alkaryl, aralkyl, etc. Specific suitable feed stocks are such compounds as ethylene, propylene, 1-butene, 1-pentene, 1-hexene, mixtures of these, etc.

The process of our invention can also be applied to polyolefinic hydrocarbons, especially conjugated dienes such as 1,3 - butadiene, isoprene, etc. or to non-conjugated dienes such as 1,5 - hexadiene, etc.

Additional suitable monomers are the vinyl aromatic compounds such as styrene, alkyl styrenes, ring-chlorinated styrenes, etc. Our inventive process can also be applied to such highly reactive olefins as indene, and similar compounds.

It should be understood that mixtures of the specific monomers can be polymerized and that the various monomers are not equivalents for the purposes of our invention; vastly different polymer products can be obtained from varying the feed stock. The catalyst of our invention is especially useful and yields unexpectedly good results when the monomer is a normally gaseous 1-olefin, especially ethylene or propylene. The preferred olefin feed stock for polymerization with our improved catalyst is ethylene. Through polymerization of ethylene with our improved catalyst, yields of high density polyethylene as high as 16,620 grams of polyethylene per gram of catalyst have been obtained at a rate of 231 grams/gram/hour.

The relative proportion of support to the transition metal compound is not a critical feature and may be varied through a wide range such that each component is present in amounts of at least about 0.1 percent. The usual metal oxide: support ratios are in the range of about 1:20 to 1:1 but with our improved catalyst we have obtained excellent results with a ratio of 10:1.

The polymerization performed without catalysts is preferably effected in the absence of impurities which tend to act as catalyst poisons, as by reacting with and consuming the catalysts or the components of the catalytic mixture, such impurities being oxygen, carbon dioxide, water, etc.

The catalysts of this invention may be promoted with the usual catalytic promoters of this art, such as aluminum and boron alkyls, aluminum sesquihalides, metal hydrides, alkali metals, etc.

The catalysts of our invention should be calcined in air or other oxidizing atmosphere, at a temperature of from about 200° C. to about 1000° C. for from about 15 minutes to about 24 hours, to activate them prior to use for polymerization. The transition metal compound and the support may be combined prior to calcination, or, if desired, the support may be calcined prior to application of the transition metal compound. In the latter case, if the transition metal compound is an oxide of a higher oxidation state, a further calcination is not necessary; however, if the transition metal compound is not an oxide, or is an oxide in a lower oxidation state, a second calcination should be performed.

Polymerization can be effected with our improved catalyst at selected temperatures which vary in accordance with the polymerization activity of the specific monomer or comonomers, catalysts, promoters, etc. The selected polymerization temperatures generally fall within the range of about −80° C. to about 400° C., more often about 0° C. to about 350° C., and preferably, from about 25° C. to about 300° C.

Polymerization can be effected at atmospheric pressure or even lower pressures, but it may be advantageous to use superatmospheric pressures in order to obtain desirably high monomer concentrations in contact with the catalysts. Thus the polymerization can be conducted at pressures up to 10,000 p.s.i. or even higher. Usually polymerization is effected at pressures between about 50 and about 2000 p.s.i.

The weight ratio of catalyst mixture to monomer can generally be varied in the range of about 0.01 to about 10 percent by weight, though greater amounts are also effective. Our improved catalyst demonstrates such exceptional activity for polymerization that amounts may be used which are so small they can be left in the polymer product without causing an undesirable coloration. Thus a difficult and expensive operation for removing catalyst from polymer may be avoided. However, the polymeric products produced through use of our improved catalysts can be subjected to a wide variety of treatments designed to remove all or part of the catalytic materials therefrom.

Polymerization may be performed in bulk or in solution using any of various reaction media so long as these remain liquid under the selected polymerization conditions of temperature and pressure. We prefer to employ relatively inert liquid reaction media such as saturated hydrocarbons, aromatic hydrocarbons, relatively unreactive olefins or cyclo-olefins, perfluoro carbons, chloroaromatics, or mixtures of suitable liquids. Illustrative suitable solvents are such compounds as propane, n-butane, n-pentane, cyclohexane, Decalin, benzene, pseudocumene, cyclo-hexene, etc.

The polymer products made with our improved catalyst can be used or treated as the polymers whose preparation is described in U.S. Patent 2,691,647 of Edmund Field and Morris Feller, granted Oct. 12, 1954. They are useful in making films, molded articles, such as bottles, for insulation, and for other uses known to the art.

The following examples are illustrative of our invention:

*Example I*

Equal quantities of vanadium pentoxide having a particle diameter of 0.010 micron and prepared by hydrolysis of vanadium oxytrichloride with high temperature steam (available from Godfrey L. Cabot Co.) and a silica which had a particle size of 0.015 to 0.020 micron, surface area of 190± 15 m.$^2$/g. (BET method) and an apparent density of about 0.05 g./cc. (Cab-O-Sil, grade M–5 available from Godfrey L. Cabot Co.) were mixed by screening together through a 100-mesh screen three times. The intimately blended mixture was charged to a 3-liter flask containing an additional 50.0 grams of the small particle diameter silica. The flask was connected to a Rinco Evaporator and tumbled for 3 hours at about 25° C. under 0.1 mm. Hg vacuum, which deaerated the mixture. A lightweight internal chain was connected to the rotating mechanism so that it flopped while the flask rotated and gently agitated the mixture, without collapsing the materials; any collapsing would cause an undesired reduction in low apparent densities. The mixtures was then calcined in an oxygen-containing gas stream (air) while the temperature was raised from 25 to 400° C. where it was held for 30 minutes, and then raised to 550° C. for an additional 30 minutes. This calcination step further dispersed the vanadium pentoxide upon the support.

A 0.42 g. sample of the white 3.7 weight percent vanadium pentoxide-silica catalyst prepared as described above was charged into a 430 cc. Fischer-Porter glass pressure reactor in a rocking mechanism, which contained 300 ml. of n-heptane as solvent, with 0.22 g. of an aluminum triisobutyl promoter; the vessel was pressured to 150 p.s.i.g. with ethylene, the temperature raised to 70° C., and the mixture was agitated by rocking. In one hour there was produced 56.5 g. of high density polyethylene, which had a melt index of 10 and a density of 0.942 g./cc. This represents a polymerization rate of 134 g. of polymer per g. of total catalyst per hour.

*Example II*

The effect of increasing the amount of promoter relative to the supported metal oxide is shown by this example.

A vanadium pentoxide-silica catalyst, having a particle size of 0.01 micron and containing 4 weight percent vanadium pentoxide, was calcined with oxygen for about 90 minutes while heated to 550° C. A 0.01 g. sample of calcined catalyst was added to 220 ml. of n-heptane solvent. Then 0.1 g. of aluminum tri-isobutyl promoter was introduced, followed by 128 g. of ethylene. Polymerization was carried out over the range of 25–88° C. at 1100 p.s.i.g. for 3 hours. There was recovered 57.8 g. of n-heptane insoluble polymer, which represents a yield of 5780 g. of polymer per g. of vanadium pentoxide-silica catalyst, at a rate of 1930 g. of polymer per g. of catalyst per hour.

Example III

To demonstrate the high yield of polymer available according to the process of our invention, this experiment was performed at a lower temperature than those preceding, lower temperatures being conducive to higher yields with the catalysts of our invention.

A 0.01 g. sample of oxygen calcined vanadium pentoxide-silica catalyst was used to polymerize 198 g. of ethylene in 200 ml. of n-heptane. The polymerization conditions were 25° C. at 1100 p.s.i.g. for 72 hours. There was obtained 166 g. of n-heptane insoluble polymer. This represents a yield of 16,620 g. of polymer per g. of vanadium pentoxide-silica catalyst at a rate of 231 g. of polymer per g. of catalyst per hour.

In order to demonstrate the criticality of maintaining low apparent density of the catalyst during preparation, Examples IV through VI were performed, using a catalyst of the invention and the same catalyst after two hours and sixteen hours of ball-milling to increase its density. The surface area of all three catalyst samples was determined according to the method described by F. M. Nelsen et al., Analytical Chemistry, 30 (1958) at pp. 1387–1390. The surface area of all three catalyst samples was about 154 m.²/g. The apparent density of the unmilled catalyst was 0.07 g./ml.; that of the catalyst milled for sixteen hours was 0.40 g./ml.

The catalyst used in the following example was prepared by dispersing a small particle vanadium pentoxide onto Cab-O-Sil silica by ultrasonic mixing in heptane suspension.

The results were as follows:

| Example | Catalyst (g.) | Ball-Milled (hours) | Al-i-Butyl Promoter, (g.) | Heptane Solvent, (g.) | Ethylene (g.) | Yield,[1] (g.) |
|---|---|---|---|---|---|---|
| IV [2] | 0.01 | 0 | 0.1 | 200 | 88 | 3,340 |
| V | 0.01 | 2 | 0.1 | 200 | 82 | 2,370 |
| VI | 0.01 | 16 | 0.1 | 200 | 78 | 1,390 |

[1] Yield in g. of solid polymer per g. of vanadium pentoxide-silica catalyst.
[2] All examples performed at 88° C., 1050 p.s.i.g. for 2 hours.

From these results it is apparent that low bulk density of the catalyst of our invention is a requisite for optimum yield of polymer per gram of catalyst.

Various modifications and variations of our invention will be apparent to those of ordinary skill in the art in light of our description hereinabove.

Having thus described our invention, what we claim is:

1. A process for the polymerization of ethylene to produce a solid polymer, which process comprises contacting ethylene with a catalyst comprising vanadium pentoxide extended upon silica, having a particle diameter of from about 0.01 to about 0.04 micron said catalyst having an apparent density of less than about 0.1 gram per cubic centimeter and with a catalyst promoter which is a trihydrocarbon aluminum, each catalyst component being present in an operative proportion of at least about 0.1 percent by weight based on the weight of the catalyst, effecting said contacting under superatmospheric pressure at a suitable polymerizing temperature in the range of from about 0° C. to about 350° C., and recovering the polymer product thus produced.

References Cited

UNITED STATES PATENTS

| | | | |
|---|---|---|---|
| 3,082,195 | 3/1963 | Peters et al. | 260—93.7 |
| 3,091,605 | 5/1963 | Hull et al. | 260—94.9 |
| 3,132,125 | 5/1964 | Schwander et al. | 260—94.9 |
| 3,239,498 | 3/1966 | Watt | 260—94.9 |

JOSEPH L. SCHOFER, *Primary Examiner.*

L. EDELMAN, W. HOOVER, J. A. SEIDLECK,
*Assistant Examiners.*

UNITED STATES PATENT OFFICE
CERTIFICATE OF CORRECTION

Patent No. 3,371,079                                February 27, 1968

Edwin F. Peters et al.

It is certified that error appears in the above identified patent and that said Letters Patent are hereby corrected as shown below:

Column 3, line 24, "without" should read -- with our --.
Column 4, line 39, "mixtures" should read -- mixture --.

Signed and sealed this 16th day of December 1969.

(SEAL)
Attest:

Edward M. Fletcher, Jr.
Attesting Officer

WILLIAM E. SCHUYLER, JR.
Commissioner of Patents